(12) United States Patent
Ma et al.

(10) Patent No.: US 9,548,529 B1
(45) Date of Patent: *Jan. 17, 2017

(54) INTEGRATED DUPLEXER AND COMBINER

(71) Applicant: Futurewei Technologies, Inc., Plano, TX (US)

(72) Inventors: Zhengxiang Ma, Summit, NJ (US); Huairen Yi, Somerset, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,828

(22) Filed: Jan. 11, 2016

(51) Int. Cl.
| | |
|---|---|
| *H04M 1/00* | (2006.01) |
| *H01Q 1/24* | (2006.01) |
| *H01Q 15/24* | (2006.01) |
| *H04B 7/04* | (2006.01) |
| *H04B 7/06* | (2006.01) |

(52) U.S. Cl.
CPC .............. *H01Q 1/246* (2013.01); *H01Q 15/24* (2013.01); *H04B 7/0413* (2013.01); *H04B 7/0617* (2013.01)

(58) Field of Classification Search
CPC ...................................................... H01Q 1/246
USPC ........................................................ 455/562.1
See application file for complete search history.

(56) References Cited

PUBLICATIONS

U.S. Appl. 14/987,513, filed Jan. 4, 2016.*

* cited by examiner

*Primary Examiner* — Sanh Phu
(74) *Attorney, Agent, or Firm* — Futurewei Technologies, Inc.

(57) ABSTRACT

An integrated duplexer and combiner in a telecommunication system, such as a cross-polarized antenna system, is disclosed. An integrated duplexer and combiner may result in a reduction in the number of transmit filters used. A transmit filter may be coupled to two receive filters through a transmission network that provides isolation between the two receive signal paths and, at the same time, provide power splitting of transmitter power to two duplexed transmit signal paths. The transmission network includes first and second λ/4 transmission lines coupled between inputs of the two receive filters. A third λ/4 transmission line couples the first and second λ/4 transmission lines to an output of the transmit filter. The two receive filters may have the same passband, while the transmit filter may have a different passband.

21 Claims, 7 Drawing Sheets

| 2T Precoding Codebook (1 Layer) | | Resulted Beam Description for 90 Degree Hybrid Port 1=A+ jB and Port 2 = B + jA | |
|---|---|---|---|
| 2 | [1,-j] | 2A | P +45° T8° beam |
| 3 | [1, j] | 2jB | P -45° T14° beam |
| 0 | [1, 1] | (1+j)(A+B) | Vertically polarized with downward tilt of 11° |
| 1 | [1,-1] | (1-j)(A-B) | Horizontally polarized with downward tilt of 11° |

Table 400

| Hybrid Type | Port 0 | Port 1 | Port 2 | Port 3 |
|---|---|---|---|---|
| 90° | A+j*B | C+j*D | A-j*B | C-j*D |
| 180° | A+B | C+D | A-B | C-D |

Table 750

*Fig. 7B*

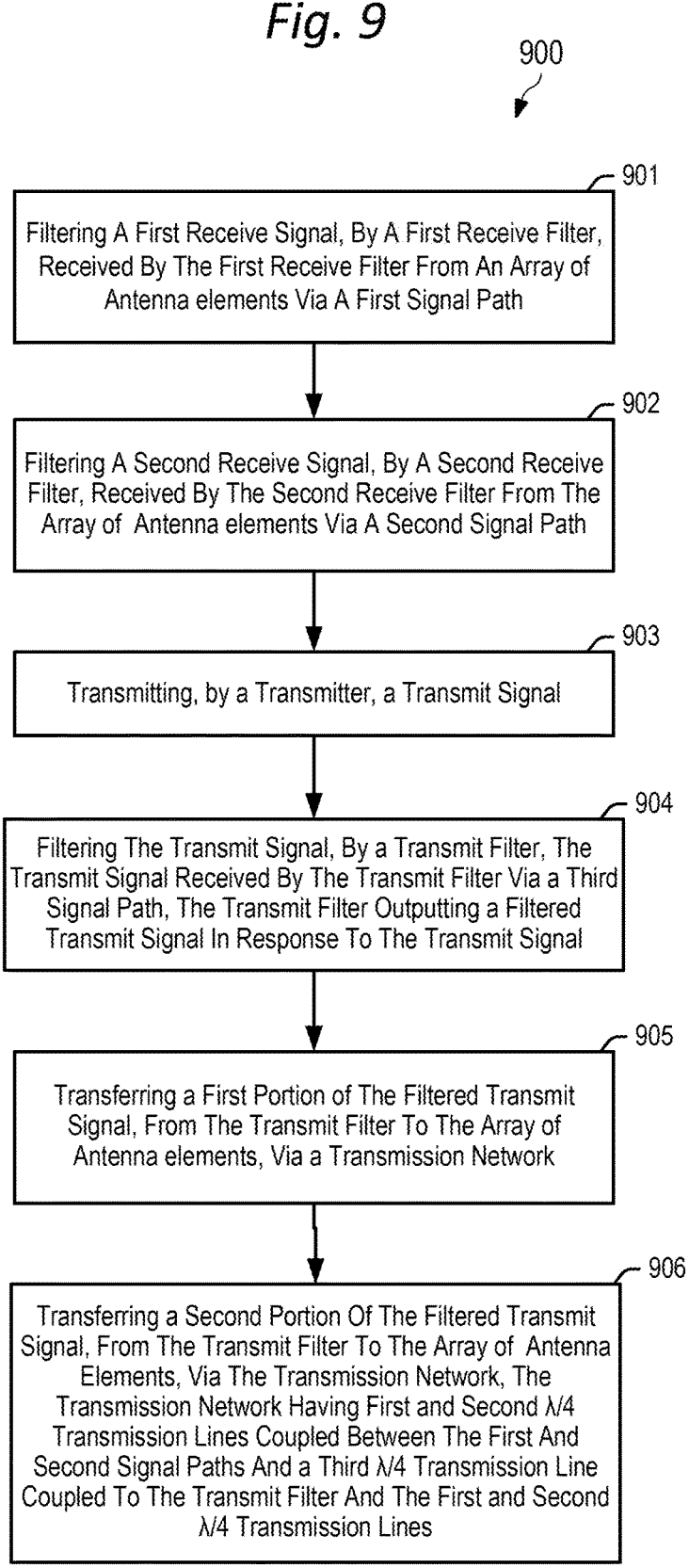

INTEGRATED DUPLEXER AND COMBINER

BACKGROUND

Telecommunication systems for wireless or cellular communications often have an antenna, or an array of antenna elements, that emits and receives radio frequency (RF) signals to and from end user equipment (UEs). Complex circuits are used to provide electrical signals to the array of antenna elements so that the appropriate RF signals are radiated to a selected UE. For example, transmitter, power amplifier, hybrid, combiner, duplexer, filter and/or distribution network circuits may be used to radiate an RF signal from an antenna. Similarly, complex circuits may be used to convert a received RF signal to an electrical signal having information.

In cross-polarized antenna systems, such as for Long Term Evolution (LTE), an antenna is designed to emit two cross-polarized RF beams at +45° and −45° polarization respectively. Further, the two polarizations are set to the same down tilt angle, for example 8°, for each of the two polarized beams. Other cross-polarized antennas system having adjustable tilt angles may provide versatile functionality for multiple-input and multiple-output (MIMO) or beamforming in general, such as versatile elevation or three-dimensional coverage.

Reducing the number of circuits used in a cross-polarized antenna system without affecting signal quality and reliability may significantly reduce the cost of manufacturing the system. Similarly, reducing the number of circuits used may reduce the time needed in testing and/or diagnosing an error in the system.

SUMMARY

In one embodiment, the present technology relates to an integrated duplexer and combiner in a telecommunication system, such as a cross-polarized antenna system. An integrated duplexer and combiner may result in a reduction in the number of transmit filters used. A transmit filter may be coupled to two receive filters through a transmission network that provides isolation between the two receive signal paths and, at the same time, provide power splitting of transmitter power to two duplexed transmit signal paths. The transmission network includes first and second quarter-wave ($\lambda/4$) transmission lines coupled between inputs of the two receive filters. A third $\lambda/4$ transmission line couples the first and second $\lambda/4$ transmission lines to an output of the transmit filter. The two receive filters may have the same passband, while the transmit filter may have a different passband for FDD (frequency division duplexing) embodiment systems.

In an embodiment, the present technology relates to a method performed by a circuit for an array of antenna elements. The method comprising: filtering a first receive signal, by a first receive filter, received from the array of antenna elements via a first signal path; filtering a second receive signal, by a second receive filter, received from the array of antenna elements via a second signal path; transmitting, by a transmitter, a transmit signal; filtering, by a transmit filter, the transmit signal received via a third signal path; outputting, by the transmit filter, a filtered transmit signal in response to the transmit signal; transferring a first portion of the filtered transmit signal, from the transmit filter to the array of antenna elements, via a transmission network; and transferring a second portion of the filtered transmit signal, from the transmit filter to the array of antenna elements, via the transmission network, the transmission network having a first and second $\lambda/4$ transmission line coupled between the first and second signal paths and a third $\lambda/4$ transmission line coupled to the transmit filter and the first and second $\lambda/4$ transmission lines.

In a further embodiment, the present technology relates to an antenna apparatus comprising: a first receive filter having an input to receive a first receive signal via a first signal path from a first plurality of antenna elements; a second receive filter having an input to receive a second receive signal via a second signal path from a second plurality of antenna elements; a first $\lambda/4$ transmission line coupled between the input of the first receive filter and a third $\lambda/4$ transmission line; a second $\lambda/4$ transmission line coupled between the input of the second receive filter and the third $\lambda/4$ transmission line; and a transmit filter having an input to receive a transmit signal, the transmit filter having an output, coupled to the third $\lambda/4$ transmission line, to output a filtered transmit signal to the first and second plurality of antenna elements via the third $\lambda/4$ transmission line, the first $\lambda/4$ transmission line, the second $\lambda/4$ transmission line, the first signal path and the second signal path.

In a further embodiment, the present technology relates to an apparatus comprising: a plurality of antenna elements; a first distribution network coupled to the plurality of antenna elements; a second distribution network coupled to the plurality of antenna elements; a third distribution network coupled to the plurality of antenna elements; a fourth distribution network coupled to the plurality of antenna elements; a first hybrid coupler coupled to the first and second distribution networks; a second hybrid coupler coupled to the third and fourth distribution networks; a third hybrid coupler coupled to the first and second hybrid couplers; a first receive filter having an input to receive a first receive signal via a first signal path from the first hybrid coupler; a second receive filter having an input to receive a second receive signal via a second signal path from the second hybrid coupler; a third receive filter having an input to receive a third receive signal via a third signal path from the third hybrid coupler; a fourth receive filter having an input to receive a fourth receive signal via a fourth signal path from the third hybrid coupler; a first transmit filter to output a first filtered transmit signal to the third hybrid coupler; and a second transmit filter to output a second filtered transmit signal to the third hybrid coupler.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 7B shows a table indicating exemplary configurations of a hybrid for each port of the system shown in FIG. 7A.

FIG. 9 is a flow diagram illustrating a method of operating a circuit in a cross-polarized antenna system according to embodiments of the present technology.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The present technology, roughly described, relates to an integrated duplexer and combiner in a telecommunication system, such as a cross-polarized antenna system. An integrated duplexer and combiner may result in a reduction in the number of transmit filters used. A transmit filter may be coupled to two receive filters through a transmission network that provides isolation between the two receive signal paths and, at the same time, provide power splitting of transmitter power to two duplexed transmit signal paths. The transmission network includes first and second quarter-wave ($\lambda/4$) transmission lines coupled between inputs of the two receive filters. A third $\lambda/4$ transmission line couples the first and second $\lambda/4$ transmission line to an output of the transmit filter. The two receive filters may have the same passband, while the transmit filter may have a different passband for FDD (frequency division duplexing) embodiment systems. Using two receivers and corresponding receive filters may increase diversity on an uplink, which may result in improved uplink performance.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Also, as used herein, the term "approximately" means that the specified value or parameter may be varied within an acceptable tolerance for a given application.

Figure 1:
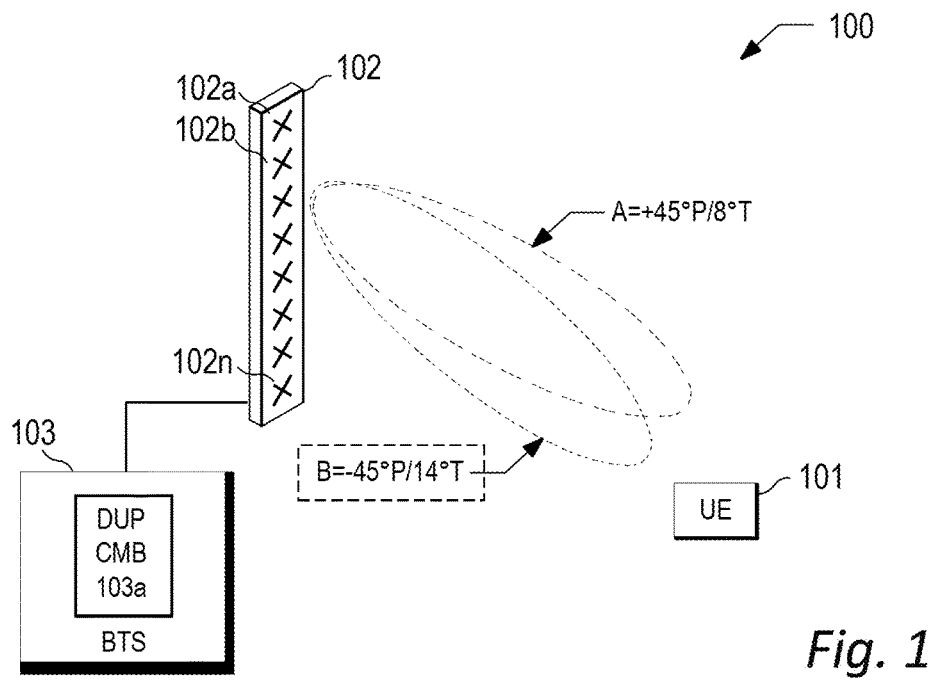
FIG. 1 is a diagram illustrating a 2T4R (2 transmit 4 receive) cross-polarized antenna system according to embodiments of the present technology.
Figure 2:
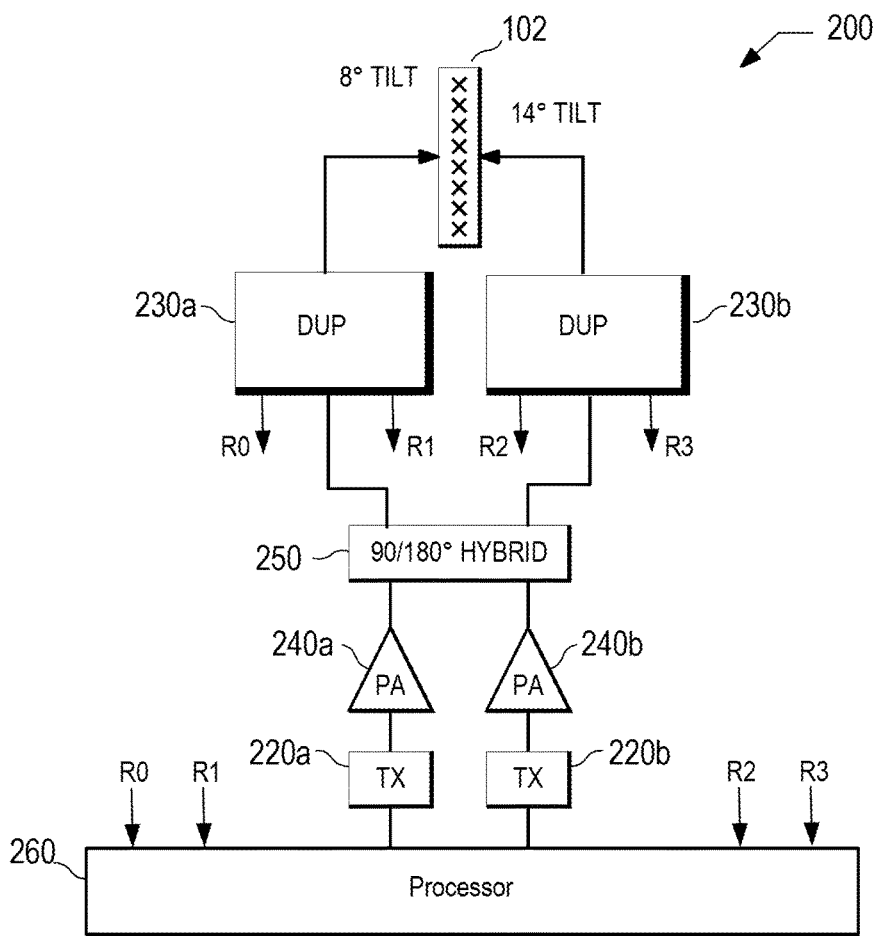
FIG. 2 is a diagram illustrating a circuit of the cross-polarized antenna system of FIG. 1 system according to embodiments of the present technology.

FIG. 1 shows a cross-polarized antenna system 100 that can be used for LTE, referred to commonly as a two transmitters four receivers (2T4R) system. A cross-polarized antenna system 100 setup employs cross-polarized antennas 102 at ±45°. In an embodiment, antenna 102 including a plurality of antenna elements 102a-n to radiate and receive RF signals to and from, for example, UE 101. In an embodiment, an antenna element includes at least one metal conductor. In an embodiment, an electrical signal is provided to antenna 102 to radiate a radio wave. Similarly, antenna 102 receives a radio wave that results in an electrical signal. In an embodiment, electronic components and/or circuits used to operate antenna 102, such as illustrated in FIG. 2, are housed in base transceiver station (BTS) 103 (also known as "base station"). In alternate embodiments, components or circuits to operate antenna 102 are located remotely from the physical location of antenna 102. In an embodiment, BTS 103 includes duplexer/combiner (DUP/CMB) 103a that operates similarly to DUP/CMBs 230a-b as illustrated in FIG. 2 and described herein. Among other advantages, DUP/CMB 103a enables a reduction in transmit filters as described herein.

Embodiment systems and methods are provided herein to provide a cross-polarized antenna with different down tilt angles that support versatile functionality for MIMO or beamforming. In order to support proper MIMO operation, multiple antennas of system 100 should have the same coverage in an embodiment. MIMO operation or beamforming functionality in the elevation dimension is provided by having the two polarizations of antenna 102 set to different down tilt angle, e.g., 8° and 140.

Embodiments of cross-polarized antenna system 100 allow different down tilt angles for the two polarizations, also referred to herein as cross-polarized (XP) user specific tilt (UST) antennas. The phrase "user specific" implies that a down tilting of the data beam is in accordance of serving different users or group of users, and down tilt angles may be set according to locations of users (or UEs). Specifically, the down tilt of two groups or sets of antenna elements 102a-n in a column of cross-polarized antenna 102 is set to different angles, such as 80 and 14° in this example. In an embodiment, this allows beam steering capability in the elevation direction, for instance through standard precoding MIMO methods in LTE.

The embodiments described herein are presented in the context of LTE systems. However, the embodiments provided can be extended to any suitable cellular systems, such as for High Speed Packet Access (HSPA), or other suitable wireless systems, such as for Wireless Local Area Network (WLAN) or Wi-Fi (Institute of Electrical and Electronics Engineers' (IEEE) 802.11x).

FIG. 2 shows circuit 200 for a cross-polarized antennas system 100 of FIG. 1. In an embodiment, antenna 102 in cross-polarized antenna system 100 is coupled to two RF transmitters (TX) 220a-b. A processor 260 may provide coded user data and signals to TXs 220a-b. In an embodiment, processor 260 may also receive coded user data and signals from antenna 102 via a receive signal path and receive filter shown in detail herein. For example, processor 260 may receive filtered receive signals R0-R3. Each TX 220a-b is coupled, via a corresponding power amplifier (PA) 240a-b and an integrated duplexer/combiner (DUP/CMB) 230a-b, to one of the two polarizations having different tilt angles in the antenna 102.

In an embodiments described in detail herein, one or more of DUP/CMB 230a-b may replace the functionality of a duplicator and combiner circuit, which may result in reduced transmit filters and cost of manufacturing circuit 200. Furthermore, circuit 200 may be easier to troubleshoot and test due to the reduction in circuit components used as well as be more reliable due to the elimination of a duplicator and combiner circuit. Rather than using a duplicator and combiner circuit, one or more of DUP/CMBs 230a-b includes two receive filters coupled to first and second $\lambda/4$ transmission lines and another (or third) $\lambda/4$ transmission line coupled to a single transmit filter in an embodiment. Further, using two receivers and corresponding receive filters may increase diversity on an uplink, which may result in improved uplink performance.

TXs 220a-b are coupled, via corresponding PAs 240a-b and a respective DUP/CMBs 230a-b, to each of the two polarizations in the antenna 102. Additionally, a 3 dB hybrid coupler 250 (either a 90° or 180° hybrid, referred to as "hybrid coupler" or "hybrid") is positioned between both PAs 240a-b and both DUP/CMBs 230a-b, as shown. In an embodiment, a hybrid 250 introduces a 90° or 1800 phase difference and/or mixing between two incoming signals. Hybrid 250 serves to equalize the coverage of the two baseband ports driving (processor 260) the two transmitters TX 220a-b. In an embodiment, this also allows power sharing between groups of antenna elements in a cross-polarized antenna so that the full power of both PAs 240a-b could be directed to any group of antenna elements in an embodiment.

In embodiments, processor 260 may be an integrated digital circuit processor with one or more cores, digital signal processor, baseband circuit, field programmable gate array, logic circuit and/or equivalent to output and receive signals to and from antenna 102. In embodiments, processor 260 may include one or more ports to output and receive signals. In an embodiment, a processor 260 may include receive circuits to receive filtered receive signals R0-R3. In embodiments, processor 260 may include circuits and/or software components to provide user data, precoding and UST encoding to signals as well as decoding filtered receive signals. In an embodiments, software components include machine readable (executable) instructions (or code) that may be stored in volatile or non-volatile memory, such as an integrated circuit memory, accessible by processor 260.

In embodiments, a signal path (described herein and/or illustrated in the figures) may include, but is not limited to, one or more of a wire, trace, transmission line, track, pad, layer, lead, metal, portion of a printed circuit board or assembly, conducting material and other material that may transfer or carry an electrical signal, light pulse and/or frequency. In embodiments, a signal path may form one or more geometric shapes, such as a line or multiple connected lines.

Figures 3, 4:
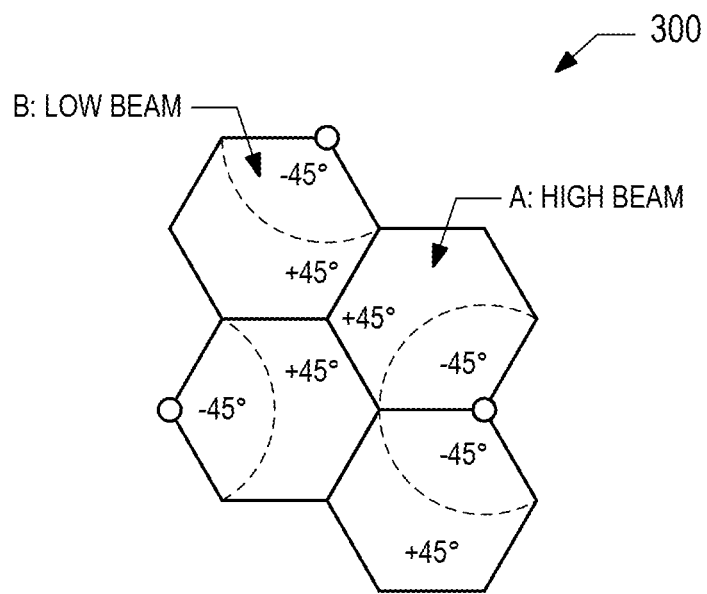
FIG. 3 is a diagram illustrating coverage areas by the cross-polarized antenna system of FIG. 1 according to embodiments of the present technology.
FIG. 4 shows a table of a two transmitters (2T) precoding codebook values and corresponding user data beams according to embodiments of the present technology.

FIG. 3 shows an embodiment of coverage areas 300 by cross-polarized antenna system 100 of FIG. 1. The coverage areas 300 represent an example of cell layout with the different down tilt angles, e.g., 8° for low beam areas and 14° for high beam areas.

FIG. 4 shows a Table 400 of 2T precoding codebook values and corresponding user data beams that may be achieved using a cross-polarized antenna system 100 system of FIG. 1. Table 400 shows that different Precoding Matrix Indicators (PMIs) correspond to beams with different down tilt angles and other characteristics.

Receiver processing in an UE 101 sends to a BTS 103, the best PMI by selecting an antenna beam that provides the best throughput. However, when an UE 101 receiver can factor in an impact of its data beams to the rest of the network, and feedback a PMI which provides the best overall network throughput, the overall network edge performance can be significantly enhanced, for example by more than about 30%, in an embodiment. This can be accomplished by an UE 101 receiver adding a PMI dependent offset to its calculation of the achievable throughput for all the PMI code words in an embodiment. This modifies the PMI feedback from UE 101, and is referred to herein as intelligent PMI selection.

Figure 5:
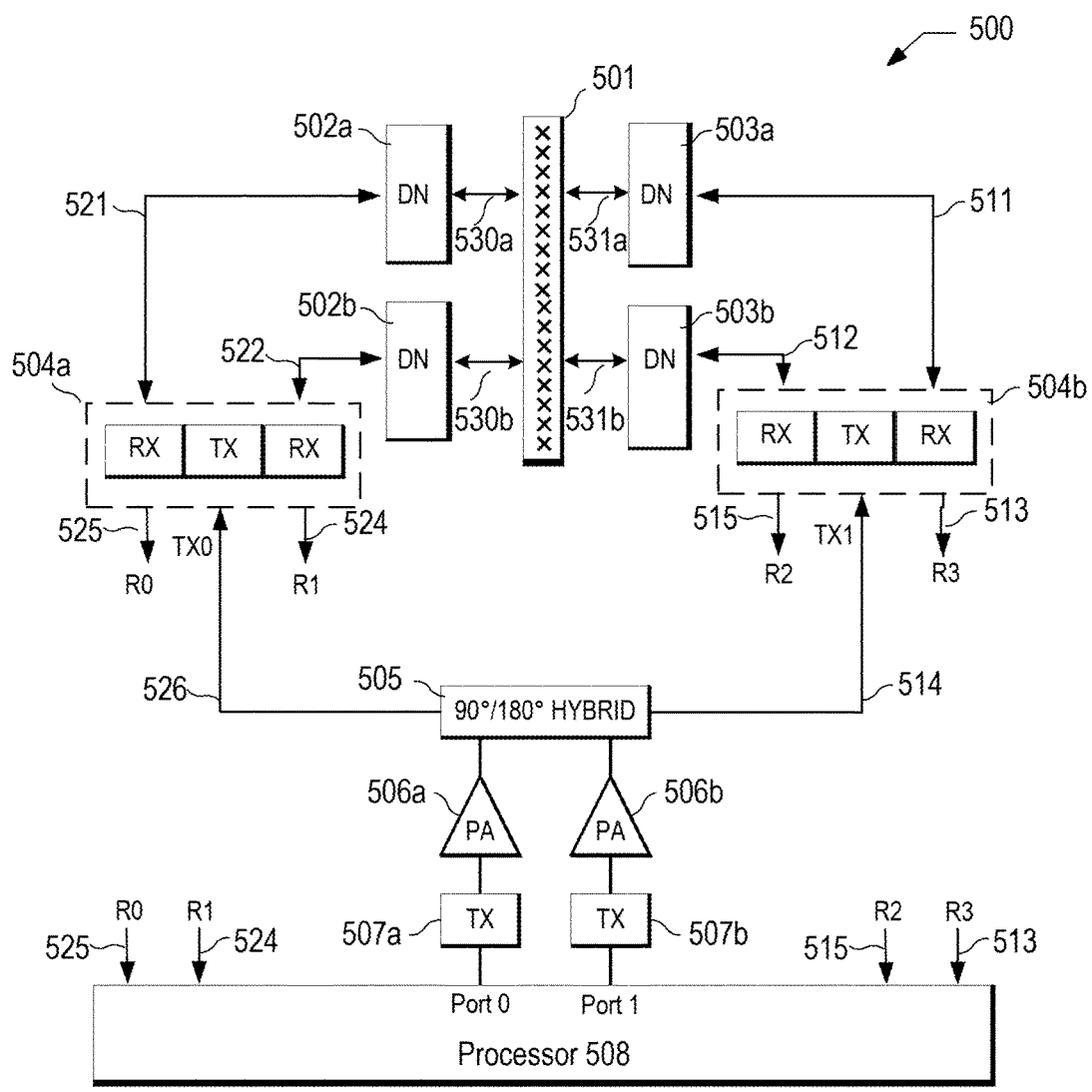
FIG. 5 is a diagram illustrating a circuit of the 2T4R cross-polarized antenna system having an integrated duplexer and combiner according to embodiments of the present technology.
Figure 6:
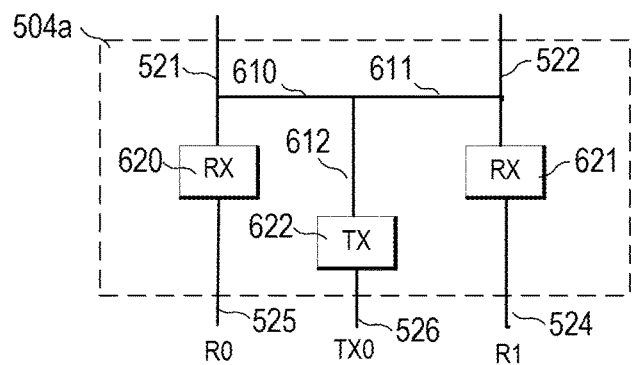
FIG. 6 is a diagram illustrating the integrated duplexer and combiner according to embodiments of the present technology.

FIG. 5 is a diagram illustrating a circuit 500 of a cross-polarized antenna system, such as a cross-polarized antenna system 100 shown in FIG. 1, having an integrated duplexer and combiner according to embodiments. FIGS. 5 and 6 illustrate a structure and operation of integrated DUP/CMBs 504a-b. Circuit 500 operates similarly to circuit 200 shown in FIG. 2. A processor 508 having ports 0 and 1 output transmit signals to TXs 507a-b and PAs 506a-b, similar to processors 260, TXs 220a-b and PAs 240a-b shown in FIG. 2. The output transmit signals of PAs 506a-b are input to a hybrid 505 (either a 90° or 180° hybrid) which outputs the two transmit signals to signal paths 526 and 514.

DUP/CMBs 504a-b receive transmit signals TX0 and TX1, via signal paths 526 and 514. In an embodiment, DUP/CMBs 504a-b filters the respective transmit signals by way of TX filters (as illustrated in FIG. 6) and outputs the filtered transmit signals to distribution networks (DN) 502a-b and 503a-b via signal paths 521-22 and 511-12.

In embodiments, DNs 502a-b and 503a-b include phase shifters to adjust an amount of down tilt for an antenna 501. In an embodiment, one or more DNs 502a-b and 503a-b may include a V network that connects a receiver to a group of antenna elements having a particular polarization. In an alternate embodiment, one or more DNs 502a-b and 503a-b may include a network that connects a receiver to half of the antenna elements for each polarization. In still another embodiment, DNs 502a-b are combined into a single DN. Similarly, DNs 503a-b may be combined into a single DN. In embodiments, one or more DNs 502a-b and 503a-b include butler matrix networks.

Antenna 501 is a single-column cross-polarized antenna in an embodiment, which operates similar to antenna 102 shown in FIG. 1. Antenna 501 radiates and receives RF signal to and from UEs, as illustrated in FIGS. 1 and 2. In an embodiment, antenna 501 includes a plurality of antenna elements partitioned or grouped to operate as separate antenna portions. For example, an antenna portion may radiate a first beam having while another antenna portion radiates a second beam to one or more UEs.

Antenna 501 is coupled to DNs 502a and 503a via signal paths 530a and 531a. Similarly antenna 501 is coupled to DNs 502b and 503b via signal paths 530b and 531b.

Similarly, receive signals from antenna 501 are provided to DUP/CMBs 504a-b via signal paths 530a-b and 531a-b, DNs 502a-b and 503a-b and signal paths 511-12 and 521-22. In embodiments, filtered receive signals R0, R1, R2 and R3 are then output from DUP/CMBs 504a-b as described herein and illustrated in FIG. 6. In an embodiment, separate receive filters in DUP/CMBs 504a-b are used for filtered receive signals R0, R1, R2 and R3. In an embodiment, filtered receive signals R0, R1, R2 and R3 are input to one or more ports of processor 508 via signal paths 525, 524, 515 and 513.

In an embodiment, processor 508 includes decoding software components and/or circuits that decodes filtered receive signals R0, R1, R2 and R3. In an embodiment, processor 508 also includes transfer and interface software components and/or circuits to transfer user data in filtered receive signals R0, R1. R2 and R3 to a predetermined destination, such as a remote server, via a wired or wireless connection. In an embodiment, user data is transferred at least in part by the Internet.

FIG. 6 illustrates an integrated DUP/CMB 504a as shown in FIG. 5 in an embodiment. Integrated DUP/CMB 504b, in an embodiment, has a similar structure and operates similarly to DUP/CMB 504a. In an embodiment, DUP/CMB 504a eliminates the need to use an additional transmit TX filter from the two duplexers that may be used in FIG. 5. In an embodiment, DUP/CMB 504a includes a single TX filter 622 and two receive (RX) filters 620-21. DUP/CMB 504a is at least different than a typical triplexer because a typical triplexer may use three filters having different passband frequencies.

In an embodiment, TX filter 622 is designed such that its input impedance at receive frequencies is a short circuit that provides isolation between RX filters 620-21 while supporting duplexing action on signal paths 521-22. $\lambda/4$ transmission lines (610 and 611 shown in FIG. 6) transforms a short circuit at the input of a TX filter 622 to an open circuit at RX filters' 620 and 621 inputs, allowing RX filters 620-21 to function typically. RX filters 620-21 may be designed with a very large input impedance (preferably infinite) at transmit frequencies so that a TX filter 622 functions typically. However, typical filters present an open circuit away from the passband. A $\lambda/4$ transmission line (612) then may be used to transform the open circuit to a short circuit as shown in FIG. 6.

In particular, DUP/CMB 504b includes two RX filters 620 and 621 as well as a TX filter 622. In an embodiment, RX filters 620 and 621 allow approximately the same frequency range of signals to pass and attenuate or reject other input signals that are not in a predetermined frequency range (passband). In an embodiment, TX filter 622 has a different passband than RX filters 620 and 621. A transmission network is used to transfer signals to and from RX filters 620 and 621 as well as to and from TX filters 622. In an embodiment, received signals are provided to respective RX filters 620 and 621 inputs via signal paths 521 and 522 in a transmission network while filtered received signals, such as R0 and R1 signals, are output via signal paths 525 and 524 in the transmission network. A transmit signal TX0 is transferred to TX filter 622 via signal path 526 in the transmission path network while a filtered transmit signal is output from TX filter 622 to an antenna via $\lambda/4$ transmission lines 612, 611 and 610 and signal path 521 and 522. In an embodiment, first and second $\lambda/4$ transmission lines 610 and 611 are coupled between inputs of RX filters 620 and 621 while a third $\lambda/4$ transmission line 612 is coupled between the output of a TX filter 622 and the first and second $\lambda/4$ transmission lines 610 and 611. In an embodiment, $\lambda/4$ transmission lines 610, 611 and 612 allow for isolation between two receive signal paths (signal paths 521 and 522) and, at the same time, provides power splitting of the transmit power of a filtered transmit signal from a TX filter 622 to two duplexed signal paths (signal paths 521 and 522). In an embodiment, power splitting of a filtered transmit signal from TX filter 622 to signal paths 521 and 522 is even as the impedance of $\lambda/4$ transmission lines 610, 611 and 612 are approximately the same. In an embodiment, $\lambda/4$ transmission lines 610, 611 and 612 each have an impedance of approximately 50 ohms.

Figure 7A:
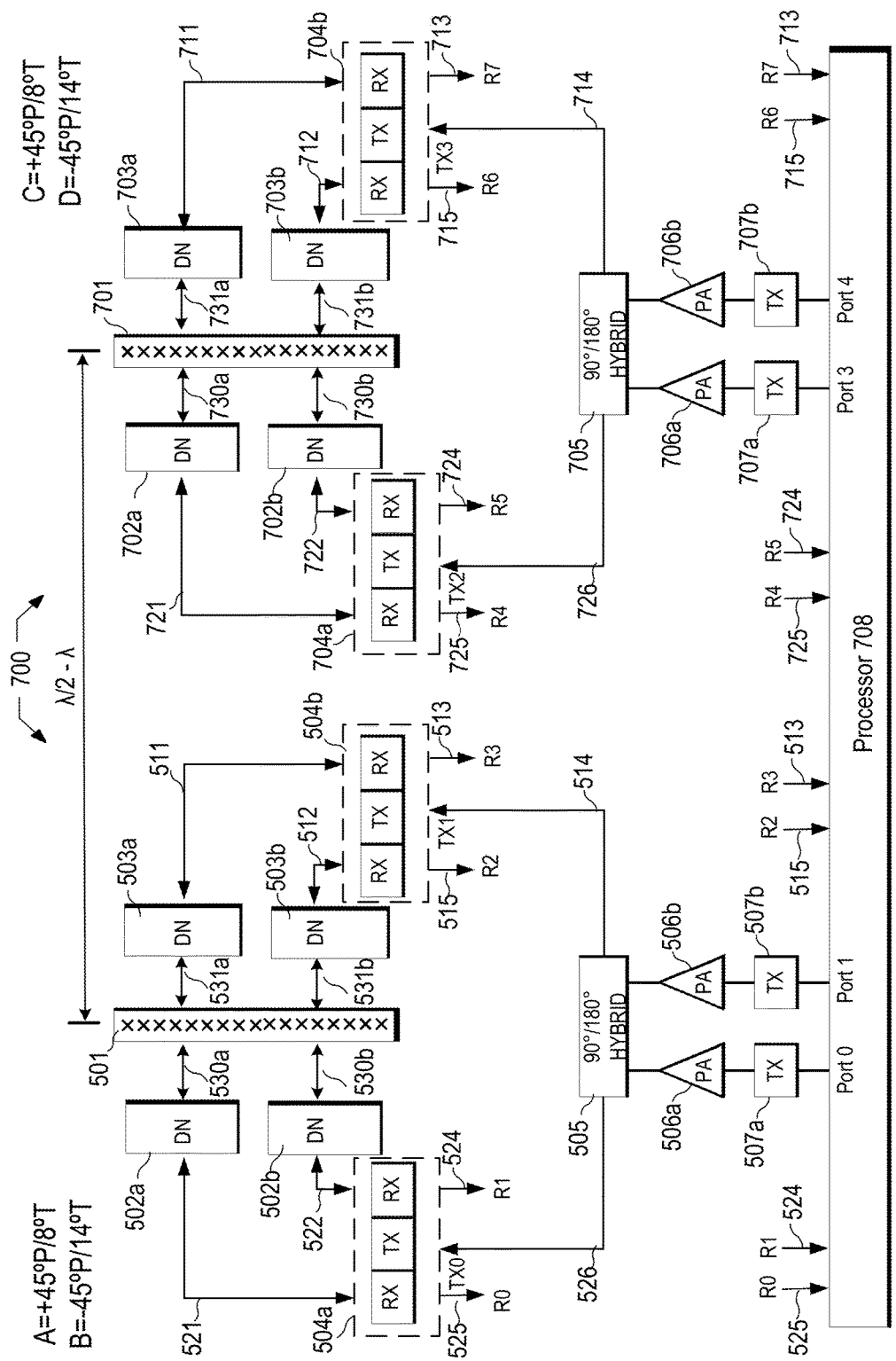
FIG. 7A is a diagram illustrating integrated duplexer and combiners in a cross-polarized antenna system having at least two columns of antenna elements according to embodiments of the present technology.

FIG. 7A illustrates integrated duplexer and combiners in a dual-column cross-polarized system 700 having at least two columns of antenna elements. In an embodiment, dual-column cross-polarized system 700 includes two single-column antennas 501 and 701 with different down tilt angles for the two polarizations in each column. For each column, a down tilt of the two cross-polarized antennas (at ±450) is set to different angles, for example at 80° and 14°.

Processor 708, operates similar to processor 508, and outputs transmit signals TX0 and TX1 from ports 0 and 1. Processor 708 also outputs transmit signals TX2 and TX3 from ports 3 and 4. In an embodiment, processor 708 receives filtered receive signals R0, R1, R2, R3, R4, R5, R6 and R7 on one or more ports of processor 708 via signal paths 524, 525, 515, 513, 725, 724, 715 and 713.

Dual-column cross-polarized system 700 may be extended to any number of suitable columns (e.g., 4 or 8 columns) in embodiments. A spacing between two columns may be from half an operation wavelength ($\lambda/2$) to a full wavelength ($\lambda$). In an embodiment, dual-column cross-polarized system 700 allows for three-dimensional (3D) beamforming capability using 4 (or more) transmitters. Table 750 shown in FIG. 7B provides an exemplary configuration of a hybrid (hybrid 505 or 705) for each port (corresponding each of the 4 transmit branches in FIG. 7A).

In an embodiment, the left side of FIG. 7A and the right side of FIG. 7A operates similar to circuits illustrated in FIGS. 5 and 6 and described herein. In particular, single-column antenna 501 and single-column antenna 701 interfaces with similar circuits shown in FIGS. 5 and 6. In an embodiment, single-column antenna 701 may include a first antenna portion or group of antenna elements and a second antenna portion. TXs 707a-b and PAs 706a-b operate similar to TXs 507a-b and PAs 506a-b. Hybrid 705 (either a 90° or 180° hybrid) operates similar to hybrid 505. Signal paths 726 and 714 output transmit signals to DUP/CMB 704a-b similar to signal paths 526 and 514. DUP/CMBs 704a-b operates similarly to DUP/CMBs 504a-b. DNs 702a-b and 703a-b as well as signal paths 721-22, 711-12, 730a-b and 731a-b operate similar to DNs 502a-b and 503a-b as well as signal paths 521-22, 511-12, 530a-b and 531a-b. Signal paths 725, 724, 713 and 715 transfers filtered receive signals R4, R5, R6 and R7 similarly to signal path 525, 524, 513 and 515 that transfers filtered receive signals R0, R1, R2 and R3. In an embodiment, filtered receive signals are transferred to processor 708 having respective receive circuits.

For embodiments with users distribution having significant elevation distribution, such as in tall buildings, two columns of antenna elements with different down tilt angles can be used to split a sector into two elevation coverage zones, which is referred to herein as vertical sectorization, offering sectorization gain. Dual-column cross-polarized system 700 may also improve cell throughput through better multi-user-MIMO (MU-MIMO) performance. In an embodiment, users can intelligently feedback a PMI selection by considering not only their own performance, but also the performance of the entire network.

Figure 8:
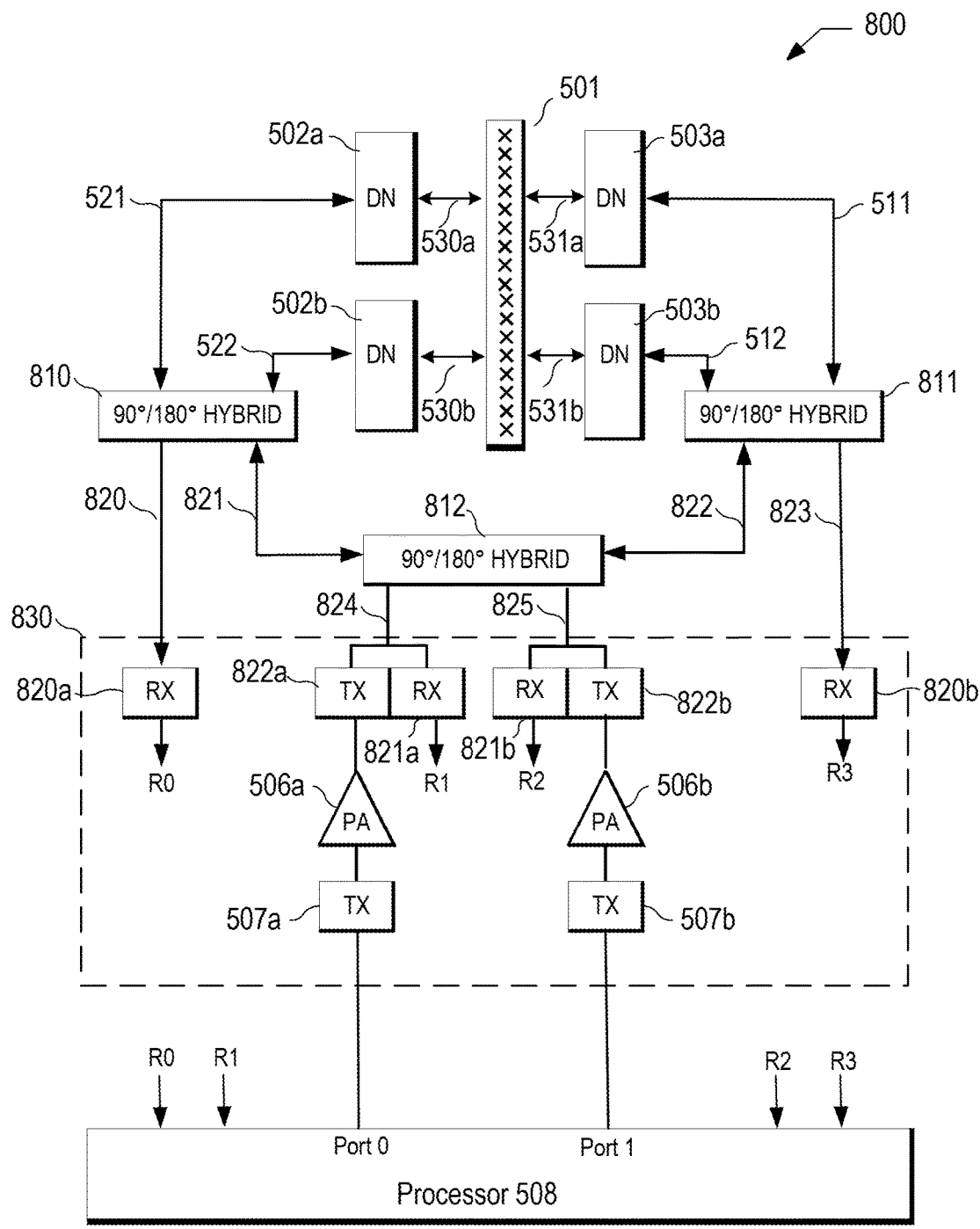
FIG. 8 is a diagram illustrating using multiple hybrids and integrated duplexers and combiners in a cross-polarized antenna system according to embodiments of the present technology.

FIG. 8 illustrates using multiple hybrids and integrated duplexers and combiners in a cross-polarized antenna system 800. In an embodiment, hybrids 810-12 are coupled between signal paths 521-22 and 511-12 and circuit component 830. In an embodiment, receiver filters 820a-b and 821a-b as well as transmit filters 822a-b, operate similarly as previously described receive filters 620 and 621 as well as transmit filter 622, and are disposed in circuit component 830. In particular, a single transmit filter 822a outputs a filtered transmit signal on signal path 824 and two receive filters 820a and 821a output two filtered receive signals R0 and R1 from signal paths 820 and 824. In an embodiment, signal path 824 includes a portion of the signal path that may be duplexed or used to carry both transmit and receive signals at different times. Similarly, a single transmit filter 822*b* outputs a filtered transmit signal on signal path 825 and two receive filters 820*b* and 821*b* output two filtered receive signals R2 and R3 from signal paths 825 and 823. In an embodiment, signal path 825 includes a portion of the signal path that may be duplexed or used to carry both transmit and receive signals at different times.

In embodiments, circuit component 830 is enclosed by a housing or included on a printed circuit board. Circuit component 830 includes PAs 506*a-b* and TXs 507*a-b*, which are coupled to ports 0 and 1 of processor 508. In an embodiment, filtered receive signals R0, R1, R2 and R3 are input to processor 508 via respective signal paths.

Hybrid 810 is coupled to circuit component 830, and in particular receive filter 820*a* by signal path 820 and hybrid 812 by signal path 821. Hybrid 812 is coupled to circuit component 830, and in particular transmit filters 822*a-b* and receive filters 821*a-b*, by signal paths 824 and 825. Hybrid 811 is coupled to circuit component 830, and in particular receive filter 820*b* by signal path 823 and hybrid 812 by signal path 822. Hybrid 810 is coupled to single-column antenna 501 via signal paths 530*a-b*, DNs 502*a-b* and signal paths 521-22. Hybrid 811 is coupled to single-column antenna 501 via signal paths 531*a-b*, DNs 503*a-b* and signal paths 511-12.

FIG. 9 illustrates a method 900 of operating a circuit in an antenna system, such as a cross-polarized antenna system according to an embodiment. In an embodiment, method 900 describes a method of operating one or more circuits in an antenna system having an array of antenna elements. In an embodiment, an array of antenna elements may be included in one or more single-column antennas. In embodiments, circuits shown in at least FIG. 2 are used to perform at least a portion of method 900. Method 900 initiates by filtering a first receive signal as illustrated by logic block 901. In an embodiment, a RX filter 620 illustrated in FIG. 6 performs at least a portion of this filtering function by receiving a first receive signal on signal path 521. Logic block 902 then illustrates filtering a second receive signal. In an embodiment, a RX filter 621 illustrated in FIG. 6 performs at least a portion of this function by receiving a second receive signal on signal path 522. Logic block 903 illustrates transmitting, by a transmitter, a transmit signal. In an embodiment, TX 507*a* shown in FIG. 5 performs at least a portion of this function. Logic block 904 illustrates filtering the transmit signal, by a transmit filter, such as transmit TX filter 622 shown in FIGS. 5 and 6. In an embodiment, the transmit signal may be received via signal path 526 and a filtered transmit signal may be output. Logic blocks 905 and 906 illustrates transferring a first and second portion of the filtered transmit signal, from the transmit filter to the array of antenna elements, via a transmission network. In an embodiment, a transmission network may include $\lambda/4$ transmission lines 610, 611 and 612 as well as signal paths 521 and 522. In an embodiment, the transmission network splits the power of the filtered transmit signal to two duplexed signal paths.

The flowcharts and block diagrams in the figures illustrate the architecture, functionality, and operation of possible implementations of systems (including circuits) and methods according to various aspects of the present disclosure. In this regard, each block in the flowchart or block diagram (or arrow in sequence diagram) may represent operations of a system component or circuit for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a circuit for an array of antenna elements, the method comprising:
   filtering a first receive signal, by a first receive filter, received from the array of antenna elements via a first signal path;
   filtering a second receive signal, by a second receive filter, received from the array of antenna elements via a second signal path;
   transmitting, by a transmitter, a transmit signal;
   filtering, by a transmit filter, the transmit signal received via a third signal path;
   outputting, by the transmit filter, a filtered transmit signal in response to the transmit signal;
   transferring a first portion of the filtered transmit signal, from the transmit filter to the array of antenna elements, via a transmission network; and
   transferring a second portion of the filtered transmit signal, from the transmit filter to the array of antenna elements, via the transmission network, the transmission network having a first and second $\lambda/4$ transmission line coupled between the first and second signal paths and a third $\lambda/4$ transmission line coupled to the transmit filter and the first and second $\lambda/4$ transmission lines.

2. The method of claim 1, wherein transferring the first portion of the filtered transmit signal to the array of antenna elements includes transferring the first portion of the filtered transmit signal via the third $\lambda/4$ transmission line, the first $\lambda/4$ transmission line and the first signal path, and
   wherein transferring the second portion of the filtered transmit signal to the array of antenna elements includes transferring the second portion of the filtered transmit signal via the third $\lambda/4$ transmission line, the second $\lambda/4$ transmission line and the second signal path.

3. The method of claim 2, wherein the first $\lambda/4$ transmission line has a first impedance and the second $\lambda/4$ transmission line has a second impedance, wherein the second impedance is the same as the first impedance.

4. The method of claim 1, wherein the first and second receive filters have a first passband and the transmit filter has a second passband that is different from the first passband.

5. The method of claim 1, wherein the first and second receive filters have the same passband.

6. The method of claim 1, comprising:
amplifying, by an amplifier, the transmit signal; and
introducing, by a hybrid coupler, a mixing of the transmit signal and another incoming signal.

7. The method of claim 1, wherein the array of antenna elements are included in a single-column antenna or in a plurality of column antennas.

8. An antenna apparatus comprising:
a first receive filter having an input to receive a first receive signal via a first signal path from a first plurality of antenna elements;
a second receive filter having an input to receive a second receive signal via a second signal path from a second plurality of antenna elements;
a first $\lambda/4$ transmission line coupled between the input of the first receive filter and a third $\lambda/4$ transmission line;
a second $\lambda/4$ transmission line coupled between the input of the second receive filter and the third $\lambda/4$ transmission line; and
a transmit filter having an input to receive a transmit signal, the transmit filter having an output, coupled to the third $\lambda/4$ transmission line, to output a filtered transmit signal to the first and second plurality of antenna elements via the third $\lambda/4$ transmission line, the first $\lambda/4$ transmission line, the second $\lambda/4$ transmission line, the first signal path and the second signal path.

9. The antenna apparatus of claim 8, wherein the first plurality of antenna elements and second plurality of antenna elements are included in a single-column cross-polarization antenna or in multi-column cross-polarization antennas.

10. The antenna apparatus of claim 9, further comprising:
a first distribution network coupled between the first plurality of antenna elements and the first signal path;
a second distribution network coupled between the second plurality of antenna elements and the second signal path;
a transmitter to output the transmit signal;
an integrated circuit processor, coupled to the transmitter, to precode the transmit signal;
an amplifier, coupled to the transmitter, to amplify the transmit signal; and
a hybrid coupler, coupled to the amplifier, to introduce a mixing between the transmit signal and another incoming signal.

11. The antenna apparatus of claim 9, wherein the filtered transmit signal is transferred to the first plurality of antenna elements via the third $\lambda/4$ transmission line, the first $\lambda/4$ transmission line and the first signal path, and
wherein the filtered transmit signal is transferred to the second plurality of antenna elements via the third $\lambda/4$ transmission line, the second $\lambda/4$ transmission line and the second signal path.

12. The antenna apparatus of claim 11, wherein the first $\lambda/4$ transmission line has a first impedance and the second $\lambda/4$ transmission line has a second impedance, wherein second impedance is the same as the first impedance.

13. The antenna apparatus of claim 12, wherein the first and second receive filters have a first passband and the transmit filter has a second passband that is different from the first passband.

14. An apparatus comprising:
a plurality of antenna elements;
a first distribution network coupled to the plurality of antenna elements;
a second distribution network coupled to the plurality of antenna elements;
a third distribution network coupled to the plurality of antenna elements;
a fourth distribution network coupled to the plurality of antenna elements;
a first hybrid coupler coupled to the first and second distribution networks;
a second hybrid coupler coupled to the third and fourth distribution networks;
a third hybrid coupler coupled to the first and second hybrid couplers;
a first receive filter having an input to receive a first receive signal via a first signal path from the first hybrid coupler;
a second receive filter having an input to receive a second receive signal via a second signal path from the second hybrid coupler;
a third receive filter having an input to receive a third receive signal via a third signal path from the third hybrid coupler;
a fourth receive filter having an input to receive a fourth receive signal via a fourth signal path from the third hybrid coupler;
a first transmit filter to output a first filtered transmit signal to the third hybrid coupler; and
a second transmit filter to output a second filtered transmit signal to the third hybrid coupler.

15. The apparatus of claim 14, wherein the first transmit filter and third receive filter are coupled to the third hybrid coupler via a single signal path.

16. The apparatus of claim 14, wherein the second transmit filter and fourth receive filter are coupled to the third coupler via a single signal path.

17. The apparatus of claim 14, wherein the third signal path may include a portion that is duplexed.

18. The apparatus of claim 14, wherein the first, second, third and fourth receive filters as well as the first and second transmit filters are included on a printed circuit board.

19. The apparatus of claim 14, wherein the first, second, third and fourth receive filters as well as the first and second transmit filters are enclosed by a housing.

20. The apparatus of claim 14, wherein the first and second receive filters have a first passband and the transmit filter has a second passband that is different from the first passband.

21. The apparatus of claim 14, wherein the plurality of antenna elements are included in a single-column antenna or in multi-column antenna.

* * * * *